US008808601B2

(12) United States Patent
Brown et al.

(10) Patent No.: US 8,808,601 B2

(45) Date of Patent: Aug. 19, 2014

(54) METHOD FOR MANUFACTURING CERAMIC FILTER

(75) Inventors: Michael C Brown, Bath, NY (US); Luiz Eduardo Ferri, Corning, NY (US); Ralph Henry Hagg, Corning, NY (US); Robert Daniel Parker, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 172 days.

(21) Appl. No.: 12/432,156

(22) Filed: Apr. 29, 2009

(65) Prior Publication Data

US 2009/0295009 A1 Dec. 3, 2009

Related U.S. Application Data

(60) Provisional application No. 61/130,404, filed on May 30, 2008.

(51) Int. Cl.

*B29C 67/24* (2006.01)

*B28B 11/00* (2006.01)

(52) U.S. Cl.

CPC .................................... *B28B 11/006* (2013.01)

USPC ......................... 264/267; 264/631; 156/89.22

(58) Field of Classification Search

USPC ................................ 264/631, 267; 156/89.22

See application file for complete search history.

(56) References Cited

U.S. PATENT DOCUMENTS

| | | | | | |
|---|---|---|---|---|---|
| 4,551,295 | A | * | 11/1985 | Gardner et al. | 264/177.11 |
| 4,559,193 | A | * | 12/1985 | Ogawa et al. | 264/631 |
| 4,568,402 | A | * | 2/1986 | Ogawa et al. | 156/89.22 |
| 5,021,204 | A | | 6/1991 | Frost et al. | |
| 5,213,737 | A | * | 5/1993 | Ford et al. | 264/109 |
| 5,316,577 | A | | 5/1994 | Wu | |
| 5,498,288 | A | * | 3/1996 | Noky | 118/305 |
| 5,811,048 | A | * | 9/1998 | Dunn et al. | 264/177.11 |
| 6,809,139 | B2 | | 10/2004 | Fabian et al. | |
| 7,052,735 | B2 | | 5/2006 | Nate et al. | |
| 7,297,175 | B2 | | 11/2007 | Miwa | |
| 2004/0029712 | A1 | * | 2/2004 | Fackler et al. | 501/141 |
| 2005/0042419 | A1 | | 2/2005 | Kato | |
| 2007/0199643 | A1 | * | 8/2007 | Kawai et al. | 156/89.22 |
| 2008/0017034 | A1 | * | 1/2008 | Becue et al. | 95/285 |
| 2008/0029938 | A1 | | 2/2008 | Nakamura | |
| 2008/0128082 | A1 | * | 6/2008 | Masuda et al. | 156/293 |
| 2008/0155952 | A1 | * | 7/2008 | Okazaki et al. | 55/523 |

FOREIGN PATENT DOCUMENTS

| | | | |
|---|---|---|---|
| EP | 1508416 | B1 | 9/2008 |
| WO | 97/39332 | | 10/1997 |

* cited by examiner

*Primary Examiner* — Yogendra Gupta

*Assistant Examiner* — Kimberly A Stewart

(74) *Attorney, Agent, or Firm* — Charles A. Greene; Timothy M. Schaeberle

(57) ABSTRACT

Honeycomb ceramic wall flow filters exhibiting reduced plug depth variability, produced by introducing flowable ceramic plugging cements into the ends of selected channels in the honeycombs and wherein the ceramic plugging cements consist of shear-conditioned mixtures exhibiting reduced viscosity differentials.

11 Claims, 1 Drawing Sheet

METHOD FOR MANUFACTURING CERAMIC FILTER

CROSS-REFERENCE TO RELATED APPLICATIONS

This application claims the benefit of priority under 35 U.S.C. §119(e) of U.S. Provisional Application Ser. No. 61/130,404 filed on May 30, 2008.

BACKGROUND

The methods disclosed herein are in the field of ceramics manufacture and relates particularly to methods for manufacturing ceramic wall flow filters made of porous ceramic materials, and to ceramic filters made in accordance with those methods.

TECHNICAL BACKGROUND

Ceramic filters are of present interest for a number of applications, including the filtration of liquid feed streams to remove solid contaminants therefrom and the treatment of effluent combustion exhaust gases from power plants and mobile emissions sources such as marine, rail and automotive engines. Wall flow filters, in particular, are finding expanding use for the removal of particulate pollutants from diesel engine exhaust gases.

Wall flow filter designs for applications such as diesel exhaust filters are well known, one common construction consisting of a porous ceramic honeycomb body comprising a plurality of adjoining parallel channels for gas flow. Selected ones of the channels are open at the filter inlet and plugged at the filter outlet, typically in an alternating checkerboard pattern, such that in-flowing exhaust gas is forced through the porous channel walls into adjoining channels. The adjoining channels, being plugged at the filter inlet, are open at the filter outlet to allow the wall-filtered exhaust gas to exit the filter. Particulates such as carbonaceous soot particles that are too large to traverse the porous channel walls are thereby trapped by and collected on the inlet channel walls, where they may be later removed by high-temperature combustion or other regeneration treatments.

Much attention has been paid during the course of exhaust filter development to the best compositions and methods for carrying out the alternate channel plugging of the ends of the honeycomb filters. At present, the commercially favored method for channel plugging involves masking each end of the filter so that only alternate channels are open, and then sprinkling, flowing, or pumping powder or paste plugging cement mixtures into the open channels to form end plugs. The plugging cements are then dried and/or heat-treated as necessary to set the plugs, often with high-temperature firing treatments carried out during or after the honeycombs themselves are fired and finished.

While these plugging practices are well established, plugging systems and plug consistency remain of concern insofar as they continue to impact filter cost and quality. Thus there remains a need to improve filter plugging methods and/or equipment to reduce manufacturing costs and product variability.

SUMMARY

Plug length (equivalently plug "depth") is a key attribute affecting ceramic filter performance since it impacts filter pressure drop, plug mechanical stability, and the thermal profiles that may be developed in the filters during rapid heating in use. One recurrent problem affecting these performance attributes is plug depth variability, i.e., differences in plug depth that may arise during the plugging process from sources such as poor equipment design or inadequate process controls. Thus large plug depth variances can result in uneven filter loading and uneven filter heating during engine startup or filter regeneration, the latter being a primary cause of filter cracking during combustion regeneration of the filters.

An important finding underlying the presently disclosed methods is that a major cause of plug depth variability in processes employing flowable plugging cements is non-uniform plugging cement viscosity. This non-uniformity has in worst cases resulted in distinct gradations in plug depth across the entire diameters of cylindrical filters, leading to corresponding gradations in filter properties and sub-optimal filter performance and durability.

The identification of viscosity variations as the source of plug depth variability was unexpected for the reason that current commercial practice includes the careful design and preparation of plugging cement formulations that are intended to be uniform in viscosity as compounded and delivered for use. We have now found that most of the variation observed is due to manner in which flowable plugging cements are customarily used in the industry, i.e., to the processes and equipment by means of which they are delivered and injected into the honeycomb channels. Current practice fails to account for the fact that cement viscosity is highly dependent upon shear history, and that most plugging systems are not designed to insure that the plugging cement charges injected into honeycomb channels share a common shear history.

The present disclosure provides broadly useful compounding and/or delivery modifications that render flowable plugging cements much less susceptible to viscosity variations arising from conventional cement handling and delivery methods. Broadly stated, this result is achieved through the expedient of shear-conditioning the cements prior to use, such conditioning being effective to decrease cement sensitivity to shear-induced viscosity changes arising in the course of subsequent cement handling and delivery.

In a first aspect, therefore, the present disclosure encompasses an improved method for manufacturing a honeycomb ceramic wall flow filter. That method includes the customary step of introducing a flowable ceramic plugging cement into ends of selected channels of a honeycomb body. However, in accordance with the present disclosure the plugging cement employed is a shear-conditioned cement that therefore exhibits low sensitivity to further variations in shear history arising in the course of use. The herein-disclosed methods are suitable for use with many of the known types of plugging cements, including those comprising blended or plasticized mixtures of ceramic powders, liquid vehicles (e.g., water) and organic binders (e.g., celluose ether derivatives). However, other cement systems incorporating high concentrations of suspended solids may benefit from shear conditioning as well.

In certain embodiments the disclosed methods are applied to advanced plugging systems enabling the simultaneous plugging of many channels at one or both ends of ceramic honeycombs in a single operation, wherein cement viscosity variations can be particularly troublesome. Thus, in a second aspect, the present disclosure provides a method for plugging selected channels traversing ceramic honeycombs wherein the flowable ceramic plugging cement is injected simultaneously into multiple ends of the selected channels from a single paste charge, and wherein viscosity variations within the paste charge are maintained below a pre-determined upper limit. In particular, we have found that maintaining internal viscosity differentials to a maximum value not exceeding 10% within each paste charge will insure good plug depth uniformity in the finished filter.

Among the advantages arising from the improved plugging process control achieved in accordance with the methods above described are increases in product selection rates, a more efficient use of plugging cements, and corresponding reductions in product cost. Improvements in filter quality including increased filter pressure drop uniformity and enhanced regeneration performance are also to be expected.

Additional features and advantages of the methods disclosed herein will be set forth in the detailed description which follows, and will be readily apparent to those skilled in the art from that description or recognized in the course of the practice of those methods as described herein, including the detailed description which follows, the claims, as well as the appended drawings.

It is to be understood that both the foregoing general description and the following detailed description present embodiments of the disclosed methods that are intended to provide an overview or framework for understanding the nature and character of those methods as hereinafter claimed. The accompanying drawings are included to provide a further understanding of those methods, and are incorporated into and constitute a part of this specification for the purpose of illustrating various embodiments and explaining the principles and modes of operations thereof.

BRIEF DESCRIPTION OF THE DRAWINGS

The methods disclosed herein are further described below with reference to the appending drawings, wherein.

DETAILED DESCRIPTION

As the above summary and following description will demonstrate, the present methods may be beneficially applied to a wide variety of plugging processes and apparatus. Accordingly, while the examples below make reference to specific plugging cement compositions and particular cement processing and plugging systems, those examples are offered for the purpose of illustration only, and are not intended to be limiting.

A common feature of many conventional plugging systems is the use of a reciprocating plunger or piston system to pump a flowable plugging cement simultaneously into multiple channels opening onto a selected face of a ceramic honeycomb. U.S. Pat. No. 5,021,204 is illustrative. These systems enable multiple plugs to be formed in a single piston cycle from a single charge of cement distributed across the face to be plugged.

Figure 1:
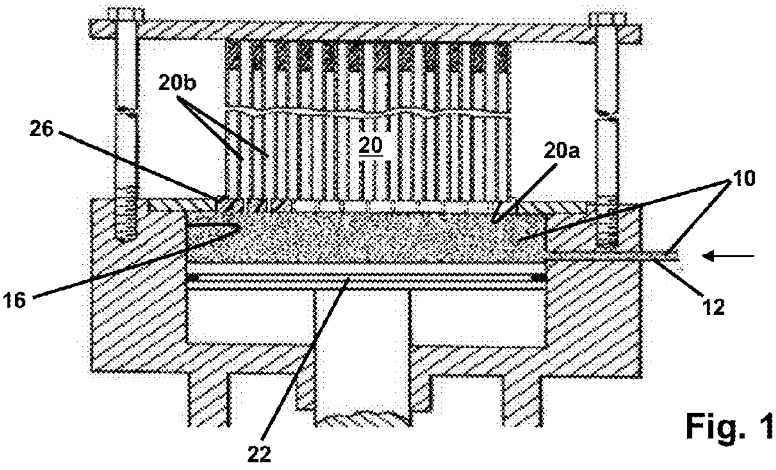
FIG. 1 schematically illustrates conventional apparatus for the plugging of selected channels ends of a ceramic honeycomb structure from a charge of plugging cement.

FIG. 1 of the drawings schematically illustrates a typical honeycomb plugging system. In the operation of that system, a charge of a plugging cement 10 is pumped from a delivery line 12 into a cement chamber within a closed cylinder 16, with one end of the cylinder being adapted to receive the end face 20*a* of a ceramic honeycomb 20 to be plugged and the other end being occupied by a piston 22 for injecting portion of cement charge 10 into selected channels, e.g., channels 20*b*, of the honeycomb. The honeycomb end face is covered by a mask 26 to block alternate channels while leaving selected channels such as channels 20*b* open to receive the cement. In cyclical fashion, a charge of cement 10 is pumped into the chamber formed by the walls of cylinder 16, the piston 22, and honeycomb end-face with mask 26, and the piston is driven toward the end face to force a controlled portion of the cement charge through the mask and into the ends of the selected channels. Thereafter, the piston is withdrawn and additional cement 10 is pumped into the cement chamber through the delivery line 12 in preparation for the plugging of another honeycomb.

This plugging system is representative of the types of systems that can disadvantageously give rise to significant variations in plug depth within individual filters. We have found that these variations arise because of relatively large internal viscosity differentials that develop between cement volumes located at different locations within the single cement charge disposed within the common cement chamber. Without intending to be bound by theory, it is presently thought that many of these viscosity differentials are the result of differences in shear history. For example, at the time of injection into the honeycomb channels, cement volumes adjacent to the delivery line into the chamber will have a viscosity close to that of the cement in the delivery line, whereas cement that has been transported across the chamber from the delivery line, having experienced repeated shearing through a large number of filling and plugging cycles, can have a much lower viscosity. The lowered viscosity may be the result of differing levels of particle-to-particle interaction as different volumes of the paste in the chamber are subjected to more or fewer cycles of the paste injection piston. Depending on chamber size and plugging cycle volume, it has been estimated that some volumes of cement may experience as many as 20 piston cycles before injection into a honeycomb channel to form a plug.

Figure 2:
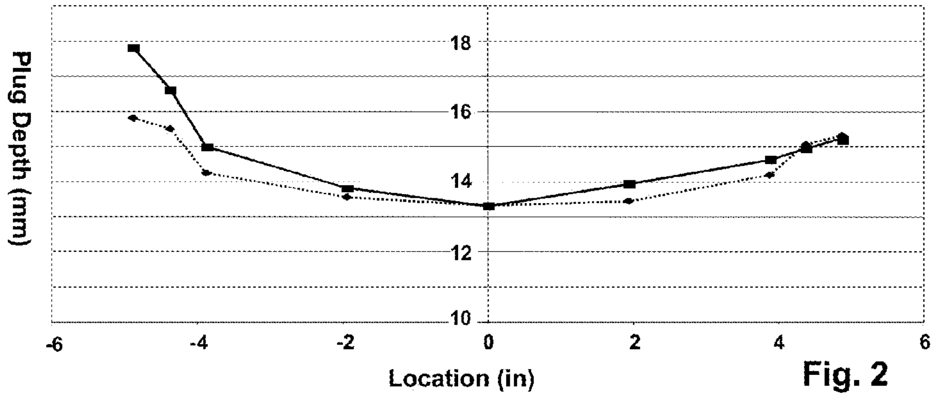
FIG. 2 plots ceramic cement plug depth across one diameter of one end face of a cylindrical wall flow filter, illustrating plug depth variability therein.

FIG. 2 of the drawing illustrates one type of plug depth non-uniformity that can be produced by plugging systems of common-chamber design. That figure includes a plot of average plug depth as a function of plug location across the face of a wall flow filter of oval cross-section. Curve 1 (solid line curve) of FIG. 2 plots average plug depth variations across the major diametrical axis of the filter face, and Curve 2 (dotted line curve) shows depth variations across the minor axis.

The non-uniformity of the average plug depth over the face of the filter analyzed in FIG. 2 is evident, with particularly large variances being present across the major filter diameter of Curve 1. Average plug depths approaching 18 mm are seen near one edge of the filter, whereas depths between 13 and 15 mm are measured at center and opposite edge of the filter. In investigating possible causes for this non-uniformity we determined that viscosities measured on cement samples taken from various locations within the cement chamber supplying the cement for these plugs showed substantial viscosity differences among the various locations. The lowest viscosities were seen at chamber locations corresponding to the locations of the longest plugs in the filter characterized in FIG. 2, confirming the finding of higher cement flows into the cells at those locations.

For flowable cements having high concentrations of suspended solids such as used to form the plugs with depths plotted in FIG. 2, cement viscosity correlates closely with the cement displacement forces that can be measured on samples of the cements by traveling ball rheometry. International patent publication WO 1997039332 discloses a method and rheometer for carrying out such measurements. Utilizing apparatus such as a Dillon test stand (Weigh-Tronix Inc., Fairmont, Minn., USA) and a Dart FGE-10x force gauge (Nidec-Shimpo America Corp., Itasca, Ill., USA) with a 2.5 cm diameter ball, we have measured displacement forces ranging from as high as 0.42 kg-F (kilograms-Force) to as low as 0.33 kg-F on cement samples taken from single charges disposed in cement chambers like that used to generate the data presented in FIG. 2. This corresponds to a maximum cement viscosity more than 25% higher than the minimum cement viscosity found in the chamber.

As noted above, one aspect of the present disclosure involves reducing the within-face plug depth variability of a plugged filter body by increasing the amount of shear experienced by the plugging cement prior to delivery to a plugging device. This so-called "shear conditioning" is accomplished through an extended mixing procedure involving mixing the batch for the plugging cement (which typically comprises ceramic powders, a vehicle such as water, and a binder such as a cellulose derivative) beyond the point where the batch has become a homogeneous cement blend. The effect of this shear conditioning is to substantially reduce the effects of subsequent shearing on cement viscosity.

Figure 3:
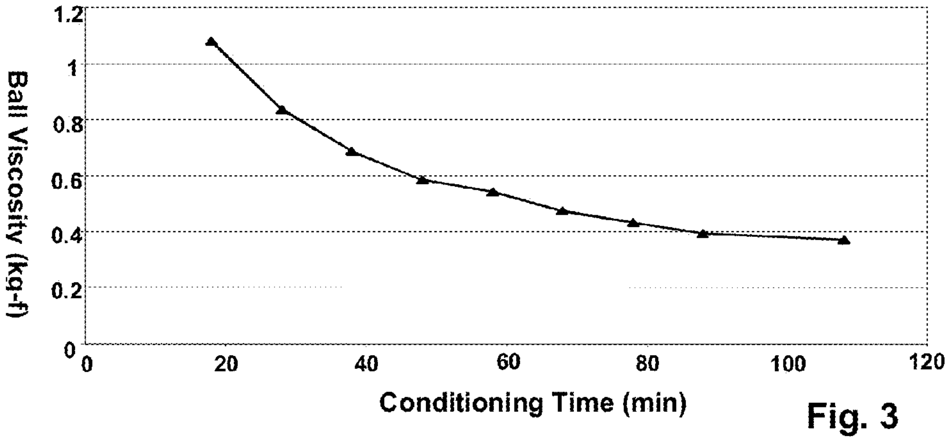
FIG. 3 plots cement effective viscosity versus shearing time during the shear conditioning of a flowable ceramic plugging cement.

FIG. 3 of the drawing provides an illustration of this effect. That drawing consists of a plot of cement viscosity as a function of extended mixing time for a conventional plugging cement of known type. The viscosity values in FIG. 3 are "ball viscosity" values corresponding to the displacement forces (in kilograms force) determined on samples of the cement by traveling ball rheometry as above described. The data is representative of that generated during the shear-conditioning of a cement formulation made from a ceramic powder mixture comprising clay, talc, alumina, silica, and graphite powders, those powders being combined with a stearate lubricant, a cellulose ether binder consisting of hydroxypropyl methylcellulose, and sufficient water (about 22% of the total batch) to form a flowable mix.

The initial or highest viscosity data point in FIG. 3 is within a range normally exhibited by conventional plugging cements after standard mixing. That is, the viscosity is of a value that would be observed after a mixing time typical for the preparation of such cements. In common practice, batches for water-binder-ceramic powder cements are worked for a time just sufficient to provide a homogeneous, flowable mix, utilizing processing times of as little as 10 minutes, and up to 18-20 minutes as shown for the initial viscosity point in FIG. 3. Such mixing is normally all that is required to achieve homogeneity utilizing commercial equipment for the processing of flowable cement mixtures of high suspended solids content.

The lowered viscosity data points plotted in FIG. 3, again as reflected by traveling ball rheometry as above described, are from cement samples taken from the cement batch during shear-conditioning of the batch in a commercial Brabender mixer for periods following the attainment of a homogeneous flowable mix. That data reflects processing over a range of extended mixing times beginning at about 20 minutes from mixer startup and continuing to a point about 2 hours after mixer startup.

The time-viscosity curve generated during this shear-conditioning treatment shows a steady reduction in slope with longer working times, indicating decreasing viscosity reductions per unit of extended mixing time as the shear-conditioning of the cement continues. That is, with the same incremental increase in shear, the respondent decrease in cement viscosity as reflected by traveling ball displacement force is less for cement that has been pre-worked or pre-sheared. As particular examples, cement viscosity (displacement force) drops by about 0.25 kg-force from the initial mix viscosity of 1.08 kg-force during the initial 7-minute conditioning period, i.e., at a rate of about 35 g-force per minute, but at a rate of less than about 0.5 g-force/min. over the final 22-minute conditioning interval.

Data establishing the advantages of plugging cement shear conditioning as illustrated in FIG. 3 above are shown in Table 1 below. Table 1 reports data generated during a plug depth variability study for a series of three plugging cement samples of identical composition but differing shear history. One of the cement samples is processed for the minimum time necessary to achieve a homogeneous mix (a total of 10 minutes), while the other two are shear-conditioned through extended mixing, one for a total of 40 minutes and one for a total of 100 minutes. The cement used is the same water-binder-ceramic powder cement composition subjected to shear-conditioning as shown in FIG. 3.

Each of the described samples is utilized to plug a number of ceramic honeycombs. The plugging equipment and process used are the same as utilized to produce the filters characterized in FIG. 2. After heat treatments to set the cements, the depths of the plugs on all filters are measured and tabulated. The results of these plug depth measurements are reported in Table 1. Included in Table 1 for each of the three cement samples evaluated is the blending or shear-conditioning time for that cement and the resulting plug depth variability for filters plugged with the cement, reported in each case as the standard deviation from the mean plug depth in millimeters.

TABLE 1

Plug Depth Variability Reduction

| Sample Number | Blending/ Shear Conditioning Time | Standard Deviation from Average Plug Depth (mm) |
|---|---|---|
| 1 | 10 min. (minimum blend) | 1.89 mm |
| 2 | 40 min. (shear-conditioned) | 1.03 mm |
| 3 | 100 min. (shear-conditioned) | .84 mm |

The data in Table 1 demonstrate that plug depth variability can be significantly reduced, without any changes to plugging cement composition and without requiring modifications of the processes and equipment utilized to carry out filter plugging, if the cements are shear-conditioned until cement sensitivity to further viscosity changes from further shearing is reduced to a pre-determined degree. The data further suggest that shear-conditioning treatments of as little as 30 minutes duration beyond that required for initial blending can reduce plug depth variability to standard deviation values approaching 1 mm.

It will be apparent to those familiar with this art that the nature and extent of mixing to achieve shear stability in these cements will vary depending upon the particular cement composition and type of mixing equipment employed. Nevertheless, all conventional plugging cements exhibit some degree of shear thinning behavior during mixing as described, and will reach a viscosity minimum over mixing intervals from minutes to hours depending on composition and processing. For water-based cements incorporating ceramic powder mixtures comprising clay, talc and alumina, and cellulose ether binders such as methyl cellulose or hydroxypropyl methylcellulose, near-minimum viscosities with substantially reduced shear sensitivity may be reached within 0.5-3 hours of shear-conditioning. Thereafter, plug depth variabilities small enough to exhibit standard deviations of less than 1 mm from the mean can readily be secured.

The minimum amount of shear conditioning required to effect useful reductions in plug depth variability can be measured in terms of a reduced cement viscosity reduction rate during shearing, or alternatively in terms of the extent to which cement viscosity approaches the minimum cement viscosity attainable through extended shear-conditioning. In general, based on data such as reported in FIG. 3 and Table 1, we have concluded that shear-conditioned cements having viscosities not more that 80% above their shear-thinned minimums, more preferably not more than 50% above those minimums will be highly resistant to viscosity variations in use.

A wide variety of methods to carry out the shear-conditioning necessary for stable cement viscosity can be employed to achieve the required reductions in plug depth variability. In addition to extended mixing times, the use of higher shearing during cement preparation, for example by means of increased mixer speeds, modified mixer arms, or the use of mixer intensifier bars, can be effective. High shearing is also attainable using equipment such as twin screw mixers that are known to provide high-torque blending and homogenizing for highly-filled paste mixtures. The use of so-called static mixers in the cement delivery system, i.e., mixers common in the glass industry that utilize mixing blocks or conduit assemblies to increase the shear experienced by transported fluids, can also offer effective cement shear-conditioning.

An alternative approach toward reducing plug depth variability in ceramic wall flow filters involves modifications to plugging equipment to minimize or reduce the shearing differentials experienced by cement charges prior to injection into the honeycomb channels. In plugging systems designed for the simultaneous plugging of multiple channel ends on one or both faces of a honeycomb in a single operation from a single charge of cement, as schematically illustrated in FIG. 1, it is conventional to inject the plugging cement from a single charged reservoir or cement chamber by travel of a single piston. Cement viscosity or viscosity variations arising from shearing differentials can be particularly troublesome in such systems, especially where the chamber is large, and is served by only one or a few cement inlets, or is shaped to include "dead zones" where the turnover of charged cement is low.

As noted above, ball rheometry data have indicated large viscosity variations within cement chambers in conventional honeycomb plugging equipment, in some cases with maximum viscosities more than 25% higher than minimum cement viscosities in a single cement charge. Reducing such variations to a level such that the maximum internal viscosity differential within each single cement charge does not exceed 10% (i.e. such that the maximum viscosity in each cement charge does not exceed the minimum viscosity by more than 10%, as reflected by ball rheometry data) can reduce average plug depth standard deviations to below 1 mm for the plugged filters. This result can readily be achieved through the use of shear-conditioned cements is reported above. Alternatively (or concurrently), the operation or design of the selected plugging system may be modified to achieve similar results.

One example of the use of an alternative approach for reducing viscosity variations within cement chambers in conventional plugging systems involves adjusting the relationship between the volume of the cement charge within the cement chamber ($V_c$) and the aggregate volume of cement injected into the selected channel ends of the ceramic honeycombs ($V_i$) during each plugging cycle. In conventional systems like that illustrated in FIG. 1, for example, the (single) cement charge can have a volume in excess of 6.5 times the volume of cement injected into each honeycomb. The correspondingly low ratio of injected cement volume to charged cement volume can result in long dwell times for substantial volumes of cement within the chamber, aggravating shear-induced viscosity variations arising within the charged cement.

In equipment suitable for the plugging of honeycombs exhibiting reduced plug depth variations, substantially increased ratios of injected cement volume to charged cement volume are employed. More particularly, the charged cement volume ($V_c$) will not exceed 6 times the aggregate injected cement volume ($V_i$), and more preferably will be less than 5 times the aggregate injected cement volume. Referring to a conventional plugging system such as illustrated in FIG. 1 of the drawing, for example, one suitable modification to achieve that result is to adjust the retracted or starting position of piston 22 upwardly toward mask 26 and honeycomb end-face 20*a*, to reduce the standard volume of cement charge 10. At the same time, the piston travel distance controlling the aggregate volume of the injected cement remains unchanged to maintain the targeted plug depth for the wall flow filter being manufactured. Of course, other equipment or operational adjustments could alternatively or additionally be made to achieve the same or similar results.

In conclusion, it will be understood that the particular examples and detailed descriptions presented above are offered for purposes of illustration only, and that various substitutions for or modifications of those particularly described embodiments may be adopted for the beneficial practice of the methods disclosed herein within the scope of the appended claims.

What is claimed is:

1. A method for manufacturing a honeycomb ceramic wall flow filter comprising:

mixing flowable ceramic plugging cement to a viscosity not more than 80% above a shear-thinned minimum for the cement composition to form a shear-conditioned flowable ceramic plugging cement;

introducing a charge of the shear-conditioned flowable ceramic plugging cement into a cement chamber occupied by a piston; and injecting a controlled portion of the charge of the flowable ceramic plugging cement from the cement chamber occupied by the piston into ends of selected channels of a honeycomb body, wherein the mixing the flowable ceramic plugging cement to a viscosity not more than 80% above a shear-thinned minimum for the cement composition is spaced apart from the ends of the channels of the honeycomb body by at least the cement chamber, and wherein the shear-conditioned flowable ceramic plugging cement is static for a period of time in the cement chamber.

2. A method in accordance with claim 1 wherein the cement composition comprises ceramic powder, a liquid vehicle, and an organic binder.

3. A method in accordance with claim 2 wherein the ceramic powder comprises clay, talc, and alumina, the liquid vehicle comprises water, the organic binder comprises a cellulose ether derivative, and the shear-conditioned cement is a product of 0.5-3 hours of extended mixing.

4. A method in accordance with claim 1 wherein the shear-conditioned cement is injected at a viscosity not more than 50% above the shear-thinned minimum.

5. A method in accordance with claim 1 wherein the plugging cement traverses a static mixer prior to introduction into the cement chamber.

6. A method in accordance with claim 1 wherein the plugging cement traverses a twin-screw mixer prior to introduction into the cement chamber.

7. A method for manufacturing a honeycomb ceramic wall flow filter comprising:

mixing flowable ceramic plugging cement to a viscosity not more than 80% above a shear-thinned minimum for the cement composition to form a shear-conditioned flowable ceramic plugging cement;

introducing a charge of the shear-conditioned flowable ceramic plugging cement into a cement chamber occupied by a piston; and injecting a controlled portion of the charge of the flowable ceramic plugging cement from the cement chamber containing the charge and occupied by the piston into ends of selected channels traversing a ceramic honeycomb, wherein the controlled portion of ceramic plugging cement is injected simultaneously into multiple ends of the selected channels from a single cement charge, wherein the single cement charge has a maximum internal viscosity differential not exceeding 10%, and wherein the mixing the flowable ceramic plugging cement to a viscosity not more than 80% above a shear-thinned minimum for the cement composition is spaced apart from the ends of the channels of the honeycomb body by at least the cement chamber.

8. A method in accordance with claim 7 wherein the flowable ceramic plugging cement has a composition comprising ceramic powder, a cellulose ether binder, and water.

9. A method in accordance with claim 7 wherein the ceramic powder comprises a kaolin clay, talc, and alumina.

10. A method in accordance with claim 7 wherein the flowable ceramic plugging cement is injected into the multiple ends in an aggregate injected cement volume $V_i$, and wherein the single cement charge has a cement volume $V_c$ not exceeding 6 times $V_i$.

11. A method in accordance with claim 10 wherein the volume $V_c$ is less than 5 times the volume $V_i$.

* * * * *